116,025

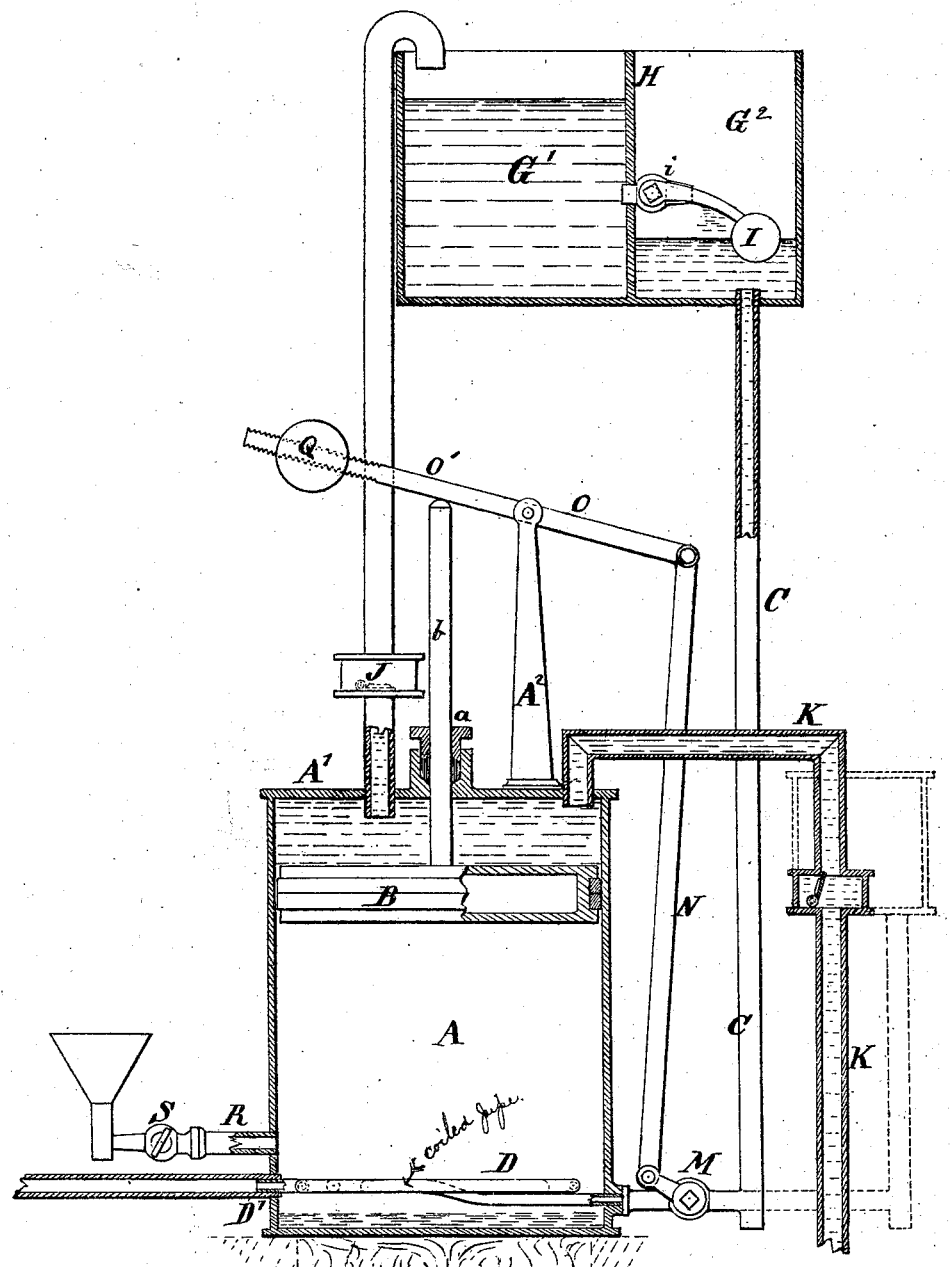

UNITED STATES PATENT OFFICE.

RODERICK F. CLOW AND WILLIAM H. DOWN, OF NEW YORK, N. Y.

IMPROVEMENT IN WATER-ELEVATORS.

Specification forming part of Letters Patent No. 116,025, dated June 20, 1871.

*To all whom it may concern:*

Be it known that we, RODERICK F. CLOW and WILLIAM H. DOWN, of New York city, State of New York, have invented certain new and useful Improvements in Water-Elevators.

The invention is an improvement on that described in the patent to M. S. McAtee, dated April 15, 1870, in which an upright cylinder, having a tight-fitting piston, was mounted on a stove or other heating means, with a quantity of water beneath the piston, and a thin vessel inclosed therein, communicating, at intervals, with a reservoir of cold water above. The flowing of cold water through this thin vessel lowered the temperature of the small quantity of water around it, and condensed the steam below the piston, causing the piston to descend and fill the space above with water from a cistern or other reservoir. Then, the current of cold water being automatically shut off, the stove heated up the small quantity of water below the piston and generated steam, which drove up the piston and forced the cold water above it up into an elevated tank, after which the operations of condensing and refilling the space above the piston were repeated.

Sixty-six per cent. of the water raised was required on the McAtee plan to effect the condensation. We have succeeded in reducing this amount to six per cent.

The accompanying drawing forms a part of this specification and represents our improvements applied in the best manner which we have yet devised, and is a vertical section through the apparatus.

Referring to the drawing, A is an upright cylinder, provided with a cover, $A^1$, and a stuffing-box, $a$, through which latter runs a piston-rod, $b$, fixed to a piston, B. A stand, $A^2$, mounted on the cylinder-cover $A^1$, carries a lever, O, having a weight, Q, and connected with a rod, M, to the lever of a cock or valve, M, which controls the condensing water descending through a pipe, C. The condensing-vessel in the lower part of the cylinder A below the piston B is in the form of a spiral or volute coil, of thin copper, represented by B. The termination of the coil leads out through the side of the cylinder and thence descends. The entire coil is either level or slightly descending from the valve M to its exit at the point $D'$. When the condensing water is allowed to descend through the valve M it exercises a powerful cooling effect in the coil D, which, by its form, exposes a very large condensing surface and allows a free circulation of the surrounding water, while it also requires but a small quantity of the surrounding water to completely immerse it. R is a pipe, having a cock, S, through which the surrounding water is introduced. The action of this portion of the apparatus is analogous to that described in the McAtee patent above referred to, except that the coil D, by its form and arrangement, presents a large surface, allows the surrounding water to circulate freely, provides that but a small quantity of the surrounding water may fill the entire space below the piston, and also allows the condensing water to escape entirely so soon as its work is done. The emptying of the coil D makes it, in a very high degree, easy for the stove or other source of heat E to raise the temperature of the water surrounding the coil D, and thus rapidly, and with but slight consumption of heat, raise the piston B.

It will be understood that the raising of the piston B tilts the lever O and opens the valve M in the same manner as the corresponding functions are performed in the McAtee patent, but with a very greatly reduced consumption of heat.

The sinking of the piston-rod $b$ liberates the lever O, which then turns, by reason of the weight Q, and closes the valve M, immediately on which the water in the coil D escapes, and its place is occupied by air, which may be admitted through a separate small pipe, not represented, leading up from the head of water, on the pipe C, outside of the apparatus, and may stand constantly open at its upper end so as to afford a vent and admit air very freely whenever the condensing water is shut off. We prefer that the piston B shall have a considerable thickness. It is preferably made of several layers, divided by a little air-space, so as to retard the transmission of heat upward from below. On the rise of the piston B the cold water filling the space above is driven upward past the self-acting valve J, and is discharged into the large compartment $G^1$ of an elevated reservoir, from which it is drawn off for use. Notwithstanding the precautions suggested to prevent the transmission of heat through the piston B, the water thus elevated is liable to become considerably warmed in the operation. It cools by standing in the elevated reservoir. We have provided means for insuring that the water allowed to descend for condensing shall have stood a long time, sufficiently to materially lower its temperature. To effect this we provide a partition in the elevated reservoir, which should be of wood or other non-conducting material, indicated by H, and we provide a small aperture, controlled by a cock, $i$, operated by a float, I, which floats on the surface of the water in the small compartment $G^2$ of the reservoir. The warm water received in the compartment $G^1$ flows through into the compartment $G^2$, cooling meanwhile, and the pipe C, leading from the compartment $G^2$, always carries down, relatively, cold water to be used for the condensing operation.

Our invention increases the efficiency of the condensing operation both by providing cooler water and by giving increased surface and increased facility for circulation of the heated fluid around the condensing-coil D. It also increases the efficiency of the heating means by avoiding the necessity which attended the use of the McAtee apparatus of heating up, not only the water surrounding the condensing apparatus, but also a large portion or the whole of the water which filled such condensing apparatus.

Some of the benefits of our invention may by realized by using a part without the whole; and various modifications may be made in the details. One modification which can be employed with our coil D without our divided reservoir, and with good results, is shown in the dotted lines, showing the condensing water taken from an enlargement, simply, of the induction-pipe K.

We claim as our invention—

1. The vented coil D, emptying itself so soon as the valve M is closed, and arranged to serve relatively to the valve M, pipe C, and elevated supply of water, and to the vessel A, heating apparatus E, piston B, and suitable automatic devices for communicating motion to the valve M, substantially as and for the purposes herein set forth.

2. The divided or two-part reservoir $G^1$ $G^2$ with the controlling-cock or valve $i$ for discharging the water from the compartment in which it is received into the cooling-compartment from which it is discharged, arranged as represented relatively to the condensing-vessel D, in an automatic steam-elevating apparatus, for the purposes specified.

In testimony whereof we have hereunto set our names in the presence of two subscribing witnesses.

R. F. CLOW.
W. H. DOWN.

Witnesses:
A. HOERMANN,
C. C. LIVINGS.